(12) United States Patent
Eberth et al.

(10) Patent No.: US 9,352,517 B2
(45) Date of Patent: May 31, 2016

(54) RESIN-TRANSFER-MOULDING METHOD (75) Inventors: Ulrich Eberth, Donauwoerth (DE); Martin Friedrich, Harsum (DE)

(73) Assignees: Airbus Deutschland GmbH (DE); Deutsches Zentrum für Luft-und Raumfahrt e.V. (DLR) (DE)

( * ) Notice: Subject to any disclaimer, the term of this patent is extended or adjusted under 35 U.S.C. 154(b) by 644 days.

(21) Appl. No.: 13/152,496

(22) Filed: Jun. 3, 2011

(65) Prior Publication Data
US 2012/0018918 A1 Jan. 26, 2012

Related U.S. Application Data

(63) Continuation of application No. 12/084,751, filed as application No. PCT/EP2006/010763 on Nov. 9, 2006, now abandoned.

(30) Foreign Application Priority Data

Nov. 10, 2005 (DE) .......................... 10 2005 053 690

(51) Int. Cl.
*B29C 70/48* (2006.01)
*B29C 45/14* (2006.01)
*B29C 45/46* (2006.01)
(Continued)

(52) U.S. Cl.
CPC ........... *B29C 70/48* (2013.01); *B29C 45/14786* (2013.01); *B29C 45/462* (2013.01); *B29C 70/546* (2013.01); *B29C 45/02* (2013.01)

(58) Field of Classification Search
CPC .. B29C 70/48; B29C 45/14786; B29C 45/462
USPC ............... 264/102, 257, 258, 328.14, 328.16, 264/328.17
See application file for complete search history.

(56) References Cited

U.S. PATENT DOCUMENTS 2,309,729 A * 1/1943 Gordon ..................... 264/328.14
2,970,732 A * 2/1961 Lawrence et al. ............... 226/50
(Continued)

FOREIGN PATENT DOCUMENTS

DE 196 30 840 C1 2/1998
DE 19630840 C1 * 2/1998
(Continued)

OTHER PUBLICATIONS

Office Action from Russia Application No. 2008123169105(027970), dated Jan. 11, 2011.

*Primary Examiner* — Matthew Daniels
(74) *Attorney, Agent, or Firm* — Lerner, David, Littenberg, Krumholz & Mentlik, LLP (57) ABSTRACT

This application describes a tool, an arrangement, and a method of manufacturing a component. The manufacturing of the component is achieved by a resin transfer from a storage chamber via a transfer line into a working chamber. Before the resin transfer, taking place, for example by a compressed air charging of the storage chamber, the storage chamber is filled with an amount of resin adjusted to the size of the component. Furthermore, a semi-finished product, consisting of cut-to-size reinforcement fibers, is inserted into the working chamber that is adjusted to the form of the component to be produced. Storage chamber, transfer line, and working chamber are configured in a one-piece mould casing of the tool. The application further describes a component manufactured by the above-mentioned tool or by the above-mentioned method respectively.

3 Claims, 3 Drawing Sheets

(51) Int. Cl.
*B29C 70/54* (2006.01)
*B29C 45/02* (2006.01)

(56) References Cited

U.S. PATENT DOCUMENTS

| | | | |
|---|---|---|---|
| 4,097,216 A * | 6/1978 | Putkowski | 425/568 |
| 5,023,041 A * | 6/1991 | Jones et al. | 264/510 |
| 5,034,177 A * | 7/1991 | Niimi et al. | 264/331.21 |
| 5,152,149 A | 10/1992 | Mostello et al. | |
| 5,393,215 A * | 2/1995 | Donovan, Sr. | 425/129.1 |
| 5,424,020 A * | 6/1995 | Hara et al. | 264/257 |
| 5,518,385 A * | 5/1996 | Graff | 425/127 |
| H001654 H * | 6/1997 | Rounds | B29C 45/14655 264/272.11 |
| 6,136,236 A | 10/2000 | Boccard et al. | |
| 6,506,325 B1 | 1/2003 | Cartwright | |
| 6,623,672 B2 * | 9/2003 | McCollum et al. | 264/40.1 |
| 6,656,411 B1 * | 12/2003 | McClure | B29C 70/547 264/257 |
| 6,723,270 B1 | 4/2004 | Sugiyama et al. | 264/255 |
| 7,633,040 B2 * | 12/2009 | Glain et al. | 219/633 |
| 7,638,083 B2 * | 12/2009 | Obara et al. | 264/328.18 |
| 2004/0047934 A1 * | 3/2004 | Caldwell, Jr. | 425/129.1 |
| 2005/0023712 A1 | 2/2005 | Backhouse | |
| 2005/0258559 A1 * | 11/2005 | Johansen et al. | 264/40.6 |
| 2008/0185755 A1 * | 8/2008 | Deaville et al. | 264/257 |
| 2008/0220112 A1 | 9/2008 | Waldrop et al. | |

FOREIGN PATENT DOCUMENTS

| | | |
|---|---|---|
| DE | 698 23 438 A | 4/2005 |
| DE | 698 23 438 T2 | 4/2005 |
| EP | 0 201 959 A1 | 11/1986 |
| EP | 0 320 302 A2 | 6/1989 |
| GB | 899876 A | 6/1962 |
| GB | 1165251 A | 9/1969 |
| JP | 61-144313 A | 7/1986 |
| JP | 06210644 A * | 8/1994 |
| JP | 11-315152 A | 11/1999 |
| JP | 11315153 A | 11/1999 |
| JP | 11348059 A | 12/1999 |
| JP | 2002137226 A | 5/2002 |
| JP | 2004099731 A | 4/2004 |
| JP | 2005271551 A | 10/2005 |
| WO | 9631267 A1 | 10/1996 |

* cited by examiner

Fig. 3

RESIN-TRANSFER-MOULDING METHOD

CROSS-REFERENCE TO RELATED APPLICATIONS

This application is a continuation of U.S. application Ser. No. 12/084,751, filed on Apr. 22, 2009, the disclosure of which is incorporated herein by reference.

FIELD OF THE INVENTION

The invention relates to the manufacturing of components, in particular to the manufacturing of fiber-reinforced composite components by means of a resin-transfer-moulding process.

BACKGROUND OF THE INVENTION

In the so-called resin transfer moulding (RTM) process, complex fiber-reinforced plastic composites with a high fiber volume content are generated by the saturation of dry fiber semi-finished products with resin. The RTM-process, also called resin injection process, is a closed process, allowing close manufacturing tolerances regarding component weight, fiber volume content, and component dimensions.

In the procedural realisation, a dry semi-finished fiber product, consisting of cut-to-size reinforcement fibers, is inserted into a two-piece tool having an upper and a lower shell. The tool is then closed and sealed. Subsequently, an external storage container filled with resin is connected to the tool via a first feeding line. Furthermore, a vacuum pump is pneumatically connected to the tool via a second feeding line. When applying a vacuum, resin is then transferred from an external storage container, being initially under atmospheric pressure, into the tool via the first feeding line. Thus, the fiber semi-finished product is permeated with resin. In order to avoid a contamination of the vacuum pump with resin, a so-called resin trap, is provided in the second line between the tool and the vacuum pump, in which resin residues are removed from the evacuated air. Optionally, the storage container may be charged with compressed air, so that the resin located there is additionally pressed into the tool. Thus, it is possible that the finished component has only as few and also as little pore-like air inclusions as possible.

By supplying heat by suitable heat elements to the tool and, thus, to the component permeated with resin, the curing of resin is effected, so that the individual fibers of the component are interconnected. After the curing has been effected, the manufactured composite component is removed from the tool. After a cleaning of the upper and lower shell, the tool is available for manufacturing new components.

Fiber-reinforced plastic composites manufactured by the RTM-process may be used for structure components in various sectors, such as in the automotive engineering and the aerospace industry. Examples for fiber-reinforced plastic products are fittings for a vertical fin of an aircraft, fairing elements of cars, or high roofs and airflow systems of trucks.

Thus, a multitude of composite components required for different applications may thus be manufactured by the RTM-process. According to the layout of the tool and the material selection, a manufacturing to finished dimensions is possible. In many cases, an extensive and cost-intensive finishing of the components is therefore no longer necessary.

Using known devices for manufacturing a component according to the RTM-process causes the problem that in an automated process the resin lines required for the RTM-process can be connected to the tool only with difficulty. For example, seals contaminated with resin material cause tightness problems, thus reducing the process security. In order to obtain an acceptable process security, a considerable cleaning effort for the external components of a corresponding device for performing a RTM-process that are connected to the tool is thus necessary before each component manufacturing.

BRIEF SUMMARY OF THE INVENTION

The object of the present invention is to provide a tool, an arrangement, and a method for manufacturing a component, allowing a simple manufacturing of components in an automated process sequence.

According to an exemplary embodiment of the present invention, a tool for manufacturing a component, in particular for manufacturing a fiber-reinforced composite component by means of a resin-transfer-moulding process, is disclosed. The tool comprises a basic moulding element. In the base element, a working chamber configured for receiving a semi-finished product, a storage chamber, configured for the receiving of resin, and a transfer line, connecting the working chamber with the storage chamber, are configured. The base element is a one-piece form.

For preventing resin contaminations outside of the moulding tool, the resin supply required for the component to be manufactured may be directly charged into the tool before the transfer operation. For this purpose, the storage chamber provided in the tool represents a reservoir for the resin supply. From this storage chamber, the resin may then be transferred into the semi-finished component located in the working chamber of the tool. The working chamber is adjusted to the form of the component to be manufactured. The semi-finished component is a so-called semi-finished product comprising reinforcement fibers cut to size according to the component dimensions.

According to another exemplary embodiment, the storage chamber is dimensioned in such a way that an amount of resin required for the component can be received. The storage chamber will expediently be dimensioned slightly larger than necessary for the exact required amount of resin. A larger resin amount may thus be received compared to the amount of resin to be transferred into the semi-finished product, so that variations in the manufacturing process, such as small air inclusions in the resin supply, do not lead to defective components.

According to another exemplary embodiment, the tool additionally comprises a cap or cover in the closed state sealing the working chamber and the storage chamber against the environment of the tool. The advantage is that the environment of the tool is not contaminated with resin, since the resin remains within the comparatively compact tool during the complete RTM-process. In particular in an automated process, problems caused by contaminated and therefore leaky seals and blocked compressed air lines are thus prevented.

It should be pointed out that the cap may also be bipartite so that, for example, the storage chamber may be sealed with the first part of the cap and the working chamber with the second part of the cap.

According to another exemplary embodiment, the tool additionally comprises a heating facility for the heating of the resin located in the storage chamber. In a clean way, the resin may thus be fed into the chamber in the cold state and be transferred into the working chamber in the heated state. The transfer of warm resin has the advantage that the viscosity of the resin is reduced, so that the resin may be transferred into the semi-finished product with a low flow resistance and, thus, within a comparatively short period of time. The direct heating of the resin has the advantage that an external heat source, for example a heated press, that does not directly come into contact with the resin may be used. In an automated process, a time-consuming cleaning of the heat source is thus dispensed with. It is also possible that not only the resin to be transferred, but additionally the complete tool is heated, so that the heated resin does not cool down at the transfer into the working chamber. The heating device may also be used for a curing of the freshly manufactured components.

According to another exemplary embodiment, the tool additionally comprises a pressure port for the charging or pressurizing of the storage chamber with compressed air. By a charging of the storage chamber with compressed air or another compressed gas with a pressure of, for example, approximately 10 bar, the resin may thus be transferred into the working chamber within in comparatively short period of time of, for example, approximately 10 min. By a pressure charging of the storage chamber, that also leads to an increased pressure in the working chamber at least at the end of the component manufacturing, it may be achieved that the finished component has only as few and also as little pore-like air inclusions as possible. This has the advantage that the stability of the manufactured components is particularly high.

According to another exemplary embodiment, the tool additionally comprises a vacuum port for evacuating the working chamber. By an evacuating of the working chamber, having taken place before the resin transfer, possible unwanted air inclusions in the component may thus be prevented.

According to another exemplary embodiment, the transfer line is configured in such a way that only liquid resin with a viscosity being below a certain threshold value may be transferred from the storage chamber into the working chamber. Thus, defined flow conditions of the liquid resin may be ensured, so that, as the result, homogeneous components of constant quality may be manufactured.

According to another exemplary embodiment, a sieve is located in the transfer line. The sieve preferably represents a flow resistance depending on the viscosity of the resin to be transferred. Thus, it may be ensured in a particularly simple and effective way that the resin may only flow through the transfer line when the viscosity of the resin does not exceed the predetermined value.

According to another exemplary embodiment, the transfer line has a flow-through channel. Depending on the cross-section of the flow-through channel, it represents a more or less large flow resistance between storage chamber and working chamber, so that preferably thin-fluid resin is transferred into the working chamber. The flow-through channel may have a siphon-like form, initially extending downwards from the bottom of the storage chamber. This has the advantage that, except for only a very small residual amount, virtually the complete resin supply may be transferred into the working chamber without having to worry about the transfer of air into the working chamber and, thus, into the component. A transfer of air would take place when the liquid level of the resin located in the storage chamber is below the inlet opening of the transfer line. Hence, the siphon-like design of the through-flow channel has the advantage that for a reliable component manufacturing only one resin quantity at a time is required resulting from the size of the component to be manufactured, with addition of a certain unavoidable residual resin amount. Thus, the loss quantity of resin arising in the component manufacturing may be minimized and the effort of cleaning the tool may be reduced.

According to another exemplary embodiment, the storage chamber is designed in such a way that the resin is pourable into the storage chamber from a dosing device. A dosing device is a particularly simple auxiliary means to provide—starting from a larger resin amount—just the required resin amount in the storage chamber. The resin may therefore be filled into the tool directly from a larger container in a simple and cost-effective way.

According to another exemplary embodiment, the storage chamber is configured in such a way that a storing bag filled with resin may be inserted into the storage chamber. The storing bag thereby contains the resin amount required for the manufacturing of a component. The bag, manufactured, for example, from a thin-walled material, preferably has an opening provided with a sieve. As well as the above-described sieve located in the transfer line, this sieve represents a certain flow resistance for the resin to be transferred. When charging the storage chamber with compressed air or when evacuating the working chamber, only liquid resin may thus be transferred into the working chamber, so that a high component quality may be ensured.

According to another exemplary embodiment, the storage chamber is designed in such a way that resin may be poured into the storage chamber in the form of a granulate. Resin granulate may be produced easily in large amounts by a cooling of liquid resin and a corresponding crushing of the possibly frozen resin. The supply of frozen resin in the form of granular grains means a particularly clean way of the resin handling. In particular when using fine granular grains, the resin amount provided in the storage chamber may be adjusted to each component to be manufactured.

According to another exemplary embodiment of the present invention, an arrangement for the manufacturing of a component, in particular for the manufacturing of a fiber-reinforced composite component by means of an RTM-process, is disclosed. The arrangement comprises an above-described tool, as well as a feeding device for the feeding of resin into the storage chamber.

It is assumed that the above-described tool may reasonably be combined with a resin feeding device, so that a RTM-process may be carried out in a simple and, particularly, in a clean way by means of the arrangement. Compared to other facilities for RTM-processes known from the prior art, the arrangement may be compactly constructed and comparatively inexpensively realized, since an extensive injection plant for the feeding of tacky and difficult-to-handle resin material is not necessary.

The arrangement according to another exemplary embodiment additionally comprises a compressed air generating device for charging the storage chamber with compressed air. Preferably all chambers of the tool are thereby sealed against the ambient air by means of a mould cap. The compressed air charging then does not cause pneumatic losses and effects a rapid and efficient resin transfer from the storage chamber into the working chamber, where the semi-finished product consisting of composite fibers is located.

The arrangement according to another exemplary embodiment additionally comprises a vacuum generating device for evacuating the working chamber. Thus, the resin transfer may not only take place by the above-explained compressed air charging of the storage chamber, but also by a rapid suction of the resin material into the working chamber. Self-evidently, also in this case the tool is sealed against the environment in order to avoid pneumatic losses. A particularly effective resin transfer is achieved by an arrangement having both a vacuum and a compressed air generating device. Thus, after the sealing of the tool by a storage chamber filled with resin, the working chamber may thereby be evacuated first and the storage chamber then be charged with compressed air. Thus, a high-quality component may be manufactured that is homogeneously permeated with resin material and, in particular, has no air inclusions due to the air remaining in the working chamber.

According to another exemplary embodiment of the present invention, a method for manufacturing a component, in particular by means of a RTM-process for manufacturing a fiber-reinforced composite component is disclosed. In the method, firstly a semi-finished product is placed in a working chamber of a tool and a resin material is placed in the storage chamber of the tool. Subsequently, the resin material is transferred via a transfer line into the semi-finished product by a charging of the storage chamber with compressed air and/or by an evacuating of the working chamber.

It is assumed that a RTM-process may be carried out in an easy and also clean manner by a tool comprising, on the one hand, an internal resin reservoir and, on the other hand, a working chamber adjusted to the form of the component to be manufactured. Hereby, the semi-finished product preferably consists of reinforcement fibers cut to size corresponding to the component dimensions.

In the method according to another exemplary embodiment, the tool is sealed against its environment after the inserting of the semi-finished product and the feeding of the resin material. Thus, no pneumatic losses by an unwanted air escape from the tool occur in the execution of the RTM-process, so that the resin is transferred into the semi-finished product in an effective manner. The sealing of the tool, carried out, for example, by a threaded connection of the base form of the tool with the corresponding cap, further ensures a clean resin transfer, at which no resin material at all exits from the tool to the environment of the tool.

In the method according to a further exemplary embodiment, the resin material present in the storage chamber is heated before the resin transfer. In an advantageous way, the viscosity of the resin to be transferred is thus reduced, so that the resin transfer may take place rapidly. Preferably, the heating of the resin present in the storage chamber is carried out in time before the storage chamber is charged with compressed air. A particularly rapid resin permeating of the semi-finished product is namely achieved exactly when not only a certain pressure is required in the storage chamber, but when additionally the viscosity of the resin falls below a certain threshold value. Therein, this threshold value depends on the flow resistance determined by the specific design of the transfer line located between the storage chamber and the working chamber.

In the method according to another exemplary embodiment of the invention, the resin material is filtered in the transfer line at the transfer from the storage chamber into the working chamber. Since the transfer line acting as a filter or having a filter element means has a certain flow resistance for the liquid resin material, the resin material may permeate the semi-finished product in a defined way. Thus, a high quality of the manufactured components may be ensured.

In the method according to another exemplary embodiment, the resin is filled into the storage chamber from a feeding device. The feeding device is a dosing device by which the resin amount optimally adjusted to the respective component size can be introduced into the storage chamber. The introducing of the resin into the storage chamber by means of the feeding device has the advantage that the resin may be taken from a large supply amount. Thus, cost-efficiently available resin material may be used for carrying out the RTM-process, so that the components may be inexpensively manufactured. Since furthermore the equipment expenses for the resin feeding by the mentioned feeding device are clearly lower than the extensive resin injection plant known from the prior art, not only the operation costs, but also the investment costs for a corresponding RTM-plant are comparatively low.

In a method according to another exemplary embodiment, a storing bag filled with resin is inserted into the storing chamber. The storing chamber is thus filled in a particularly clean manner with the required amount of resin. The storing bag has an outlet opening provided with a sieve, so that due to the flow resistance of the sieve only liquid resin may exit the bag and be transferred into the working chamber.

In a method according to another exemplary embodiment, the resin is filled into the storage chamber in the form of a granulate. The feeding of preferably frozen resin in the form of granular grains is a especially clean manner of resin handling. In particular when using fine granular grains, the resin amount provided in the storage chamber may be adjusted precisely to each component to be manufactured.

According to another exemplary embodiment of the invention, a component, in particular a fiber-reinforced composite component, is disclosed. The component is characterized by the fact that it is manufactured by a method described above.

It is assumed that by a RTM-process carried out as described above fiber-reinforced composite components having furthermore a high mechanical strength may be cleanly and, furthermore, inexpensively manufactured.

BRIEF DESCRIPTION OF THE DRAWINGS

Further advantages and features of the present invention will be apparent from the following exemplary description of presently preferred embodiments. In the drawings, in schematic representations

DETAILED DESCRIPTION

Let it be noted here that in the drawings the reference numerals of same or corresponding components only differ in their first number.

Figure 1:
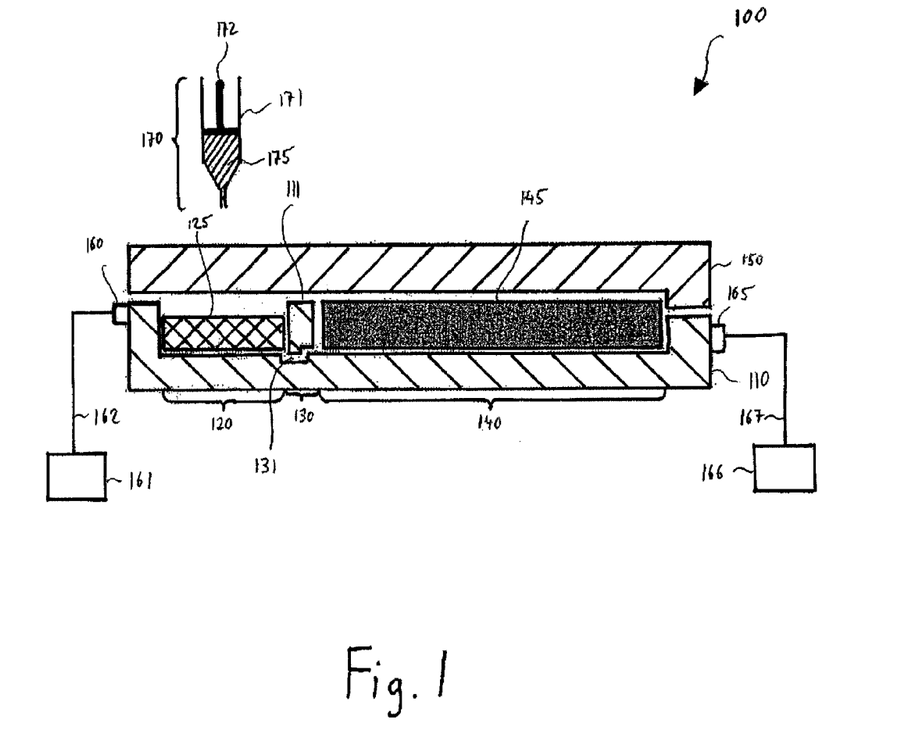
FIG. 1 shows an arrangement for manufacturing a fiber-reinforced composite component with a dosing device and a tool into which a resin supply is introduced by means of the dosing device.

FIG. 1 shows a tool 100 for manufacturing a fiber-reinforced composite component by means of a RTM-process. The tool 100 comprises a one-piece mould casing (Formwanne) 110, in which a storage chamber 120, a transfer line 130, and a working chamber 140 are configured. The working chamber 140 is dimensioned in such a way that a semi-finished product 145, consisting of cut-to-size reinforcement fibers, may be precisely inserted into the working chamber 140 in a manner taking into account predetermined tolerances. The storage chamber 120 is dimensioned in such a way that a resin supply 125 adjusted to the size of the component may be inserted into the tool 100.

For the filling of the storage chamber 120 with resin 125, a dosing device 170 is provided, having a preferably cylindrical storage container 171, in which a larger amount of resin 175 is available. For the selective dosing of the resin amount to be fed, a piston or male mould 172 is provided that may be pressed down by a driving mechanism (not illustrated), so that the liquid resin drops into the storage chamber. The driving mechanism for the piston 172 operates so precise that an exactly predeterminable movement of the piston 172 is generated and, thus, the exactly required resin amount is respectively injected into the storage chamber 120.

Furthermore, a transfer line 130 is provided in the tool 110, connecting the storage chamber 120 with the working chamber 140. In the transfer line 130 runs a bridge (Steg) 111, so that the transfer line 130 actually forms a siphon-like flow-through channel 131, running slightly below the floor areas of the storage chamber 120 and the working chamber 140. Thus, except for only a very small residual amount, virtually the complete resin supply may be transferred into the working chamber without having to worry about the transfer of air into the working chamber and, thus, also into the component. A transfer of air would have to be feared when the liquid level of the resin located in the storage chamber is below the inlet opening of the transfer line.

The bridge 111 is preferably part of the one-piece mould casing 110.

The tool 100 furthermore comprises a mould cap 150 having seals (not illustrated), so that all chambers of the tool 100 may be sealed. In order to provide a stable sealing, the mould cap 150 and the mould casing 110 are designed in such a way that the mould cap 150 may be fixed to the mould casing 110 by means of a threaded connection, likewise not illustrated.

The tool is furthermore provided with two pneumatic ports, a pressure port 160 and a vacuum port 165. The pressure port 160 is connected to a compressor 161 via a compressed air line 162, the vacuum port 165 is connected to a vacuum pump 166 via an evacuating line 167.

In the following, a RTM-process is described effecting a resin transfer from the storage chamber 120 into the working chamber 140. Self-evidently, the resin transfer may only take place after a) the storage chamber 120 has been filled with the corresponding resin amount, b) the semi-finished product has been inserted into the working chamber 140, and c) the mould cap has been closed.

Firstly, the vacuum pump 166 is activated so that all chambers of the tool 100 and, in particular, the working chamber 140 are evacuated. Furthermore, the resin supply 125 located in the storage chamber 120 is heated by means of a heating device (not illustrated in FIG. 1), so that the viscosity of the resin 125 decreases. Subsequently, the charging of the storage chamber 120 with compressed air supplied via the compressed air connection 160 takes place. Afterwards, the resin 125, whose viscosity is now so low that the flow resistance determined by the cross-section of the flow-through channel 131 may be overcome, is transferred into the working chamber 140 and, thus, into the semi-finished product 145. After the resin transfer into the semi-finished product has taken place and after a possible thermal curing of the manufactured component, the mould cap 150 is opened, so that the manufactured component may be taken out. After a short cleansing of the tool 100 of possibly adhering residues of resin, the tool 100 may be re-used for the manufacturing of a new component.

Figure 2:
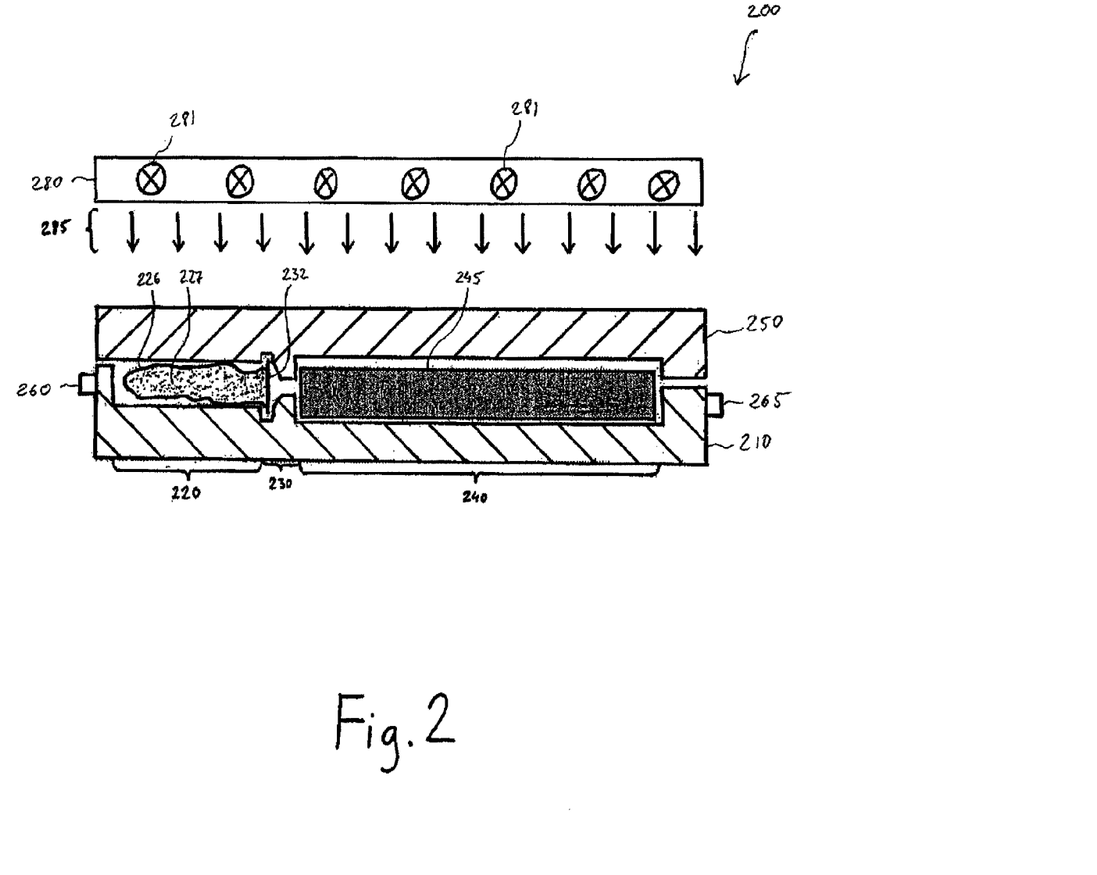
FIG. 2 shows an arrangement for manufacturing a fiber-reinforced composite component with a heating device and a tool into which a resin supply packaged in a storing bag is inserted.

FIG. 2 shows an arrangement for manufacturing a fiber-reinforced composite component, the arrangement of which has a tool 200 and a radiant heater 280. The tool 200 is designed in such a way that a resin supply 227, enclosed by a bag 226, may be inserted into a storage chamber 220.

The tool 200 differs from the tool 100 illustrated in FIG. 1 only in the fact that the storage chamber 220 is specifically designed for receiving the bag 226 and that a transfer line 230 is present having a sieve 232 instead of a flow-through channel that serves for filtering the solid resin parts or the impurities from the resin 227 to be transferred. The tool 200 includes in an analogous way to the tool 100 a one-piece mould casing 210, in which the storage chamber 220, the transfer line 230, and a working chamber 240 are configured. A semi-finished product 245, consisting of cut-to-size reinforcement fibers, is located in the working chamber 240. The tool 200 further comprises a mould cap 250, as well as two pneumatic ports, a pressure port 260 and a vacuum port 265.

For the heating of the resin 227 located in the storage chamber, the radiant heater 280 is positioned above the tool in a suitable manner. By turning on the heating lamps 281, a radiant heating 285 is generated, effecting the tool and, in particular, the resin supply 227 present in the storage chamber 220. In order to achieve an efficient heating, the heating operation may already start before the closing of the mould cap 250. The radiant heater 280 may also be positioned in such a way that not only the resin supply 227 but also the complete mould casing 210 is heated so that at a resin transfer into the working chamber 240 the transferred resin does not or only insignificantly cool down and, thus, the complete transfer takes place at a most constant viscosity of the resin 227. The heating operation may also be continued some time after the closing of the mould cap 250 so that the heated mould cap 250 contributes to a constant temperature of the resin 227 during the transfer. A heated tool 200 may furthermore cause an intended curing of the component after the resin transfer has taken place.

It should be pointed out that instead of a radiant heater also other types of heating systems for heating the resin supply 227 and/or the tool 210 may be used. For example, a heater blower may be utilized, blowing hot air in the direction of the tool 200. Likewise, an electric heating with corresponding heating wires may be provided in the mould casing 210 and/or the mould cap 250. Alternatively, an external induction heating would be possible that generates eddy currents in the mould casing 210 and/or in the mould cap 250, resulting in the heating of the tool 200. A precondition for this is that the mould casing 210 and/or the mould cap has a magnetic material.

According to the present state of knowledge, a particularly suitable type of heating is a combined clamping and heating device, pressing, on the one hand, the mould cap 250 firmly onto the mould casing 210 via hot clamping legs, and causing, on the other hand, a heating of the tool by a good thermal contact between the first hot clamping leg and the mould casing 210, as well as between the second hot clamping leg and the mould cap 250.

The resin transfer from the storage chamber 220 into the working chamber 240 takes place by the RTM-process, described above by means of FIG. 1 and is not described again in more detail here. However, it should be pointed out that the complete execution of the RTM-process, including the filling of the storage chamber 220, may be achieved in a particularly clean manner due to the resin amount 227 being pre-dosed in the storing bag 226. By the use of the storing bag 226, it may be prevented that tacky resin contaminates the environment of the tool 200.

Figure 3:
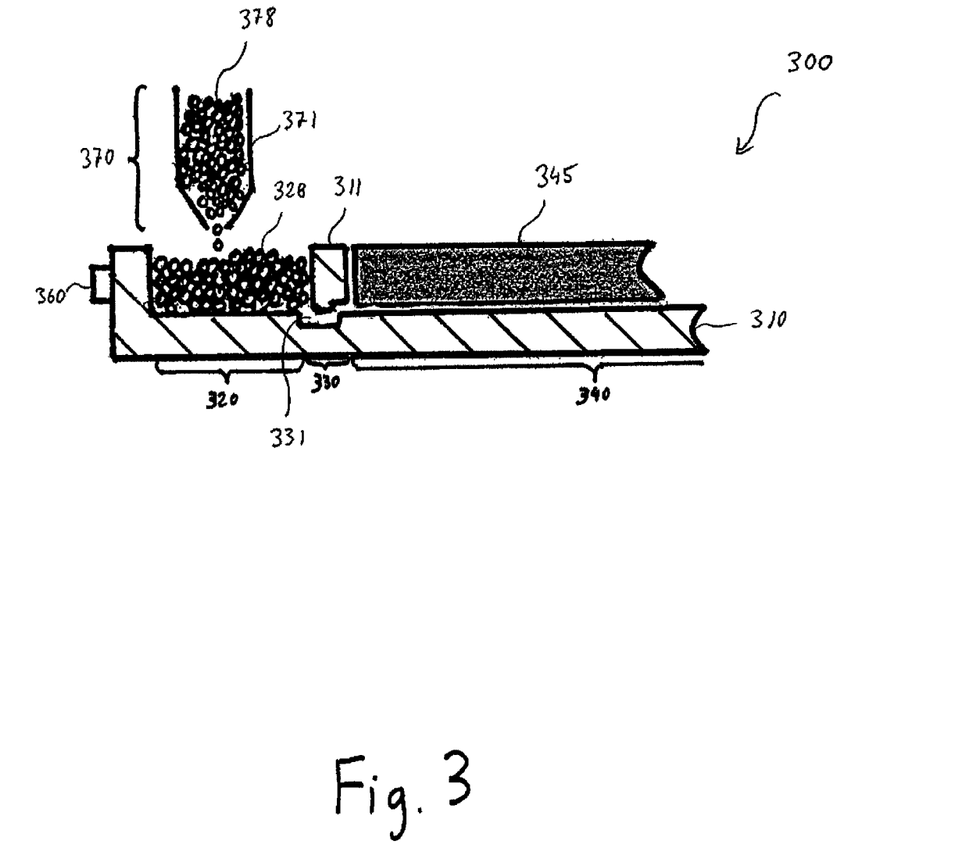
FIG. 3 shows an arrangement for manufacturing a fiber-reinforced composite component with a tool and a resin feeding device filling a resin supply in the form of a frozen granulate into the tool.

FIG. 3 illustrates a detail of a tool being identical with the tool illustrated in FIG. 1 and now marked by the reference numeral 300. In addition to a mould cap (not illustrated), the tool comprises a one-piece mould casing 310, in which a working chamber 320, a transfer line 330, and a working chamber 340 are configured. The transfer line 330 comprises a bridge 311 that, together with the floor of the mould casing, forms a flow-through channel 330. In the working chamber 340, a semi-finished product 345, consisting of cut-to-size reinforcement fibers, is located. The tool further has a pressure port 360 and a vacuum port (not illustrated).

The filling of the storage chamber 320 with resin 328 is achieved by a dosing device 370, having a cylindrical storage container 371 filled with a resin granulate material 378. By suitably controlling of the dosing device 370, individual granule grains consisting of a frozen resin material, are released from the dosing device 370 and fall into the storage chamber 320. In particular the resin amount required for the manufacturing of a component may thus be provided in a clean way, too.

After closing the tool 300 with a mould cap (not illustrated), the resin 328 and/or the complete tool 300 is heated, so that the resin granulate transforms into liquid resin material. The resin transfer from the storage chamber 320 into the working chamber 340 and, thus, into the semi-finished product 345 is achieved by the RTM-process that was described above by means of FIG. 1 and is not described again in more detail here.

It should be pointed out that, irrespective of the type of resin introduced into the storage chamber, the transfer line may be provided with a flow-through channel, a sieve and/or other elements. It is merely appropriate that the transfer line represents a certain flow resistance. Thus, a defined transfer of liquid resin may be ensured wherein the resin is permitted to have at maximum a certain predetermined viscosity.

Let it additionally be noted that the term "having" or "comprising" does not preclude any other elements or steps and "one" or "a" do not preclude a plurality. Furthermore, let it be noted that features or steps that were described with reference to one of the above exemplary embodiments may also be used in combination with other features or steps in other exemplary embodiments described above. Reference numerals in the claims are not to be regarded as limiting.

In summarizing, the following can be noted: The application describes a tool, an arrangement, and a method for manufacturing a component. The component manufacturing is achieved by a resin transfer from a storage chamber into a working chamber via a transfer line. Before the transfer, taking place, for example, by a compressed air charging of the storage chamber, the storage chamber is filled with a resin amount adjusted to the size of the component. Furthermore, a semi-finished product, consisting of cut-to-size reinforcement fibers, is inserted into the working chamber that is preferably adjusted to the form of the component to be produced. Storage chamber, transfer line, and working chamber are configured in a one-piece mould casing of the tool. The application further discloses a component manufactured by the above-mentioned tool respectively by the above-mentioned method.

LIST OF REFERENCE NUMERALS 100 tool
110 mould casing
111 bridge
120 storage chamber
125 resin
130 transfer line
131 flow-through channel
140 working chamber
145 semi-finished product consisting of cut-to-size reinforcement fibers
150 mould cap
160 pressure connection
161 compressor
162 pressure air line
165 vacuum connection
166 vacuum pump
167 evacuating line
170 dosing device
171 cylindrical storage container
172 piston
175 resin
200 tool
210 mould casing
220 storage chamber
226 bag
227 resin
230 transfer line
232 sieve
240 working chamber
245 semi-finished product consisting of cut-to-size reinforcement fibers
250 mould cap
260 pressure connection
265 vacuum connection
280 radiant heater
281 heating lamp
285 radiant heating
300 tool
310 mould casing
311 bridge
320 storage chamber
328 resin granulate
330 transfer line
331 flow-through channel
340 working chamber
345 semi-finished product consisting of cut-to-size reinforcement fibers
360 pressure connection
370 dosing device
371 cylindrical storage container
378 resin granulate

The invention claimed is:

1. A resin transfer moulding method for manufacturing a fiber-reinforced composite component inside a moulding tool comprising:
   inserting a semi-finished product into a working chamber located in a base element of the moulding tool, the base element being a one-piece form;
   feeding a resin material in the form of granules from a feeding device positioned above the base element of the moulding tool into a storage chamber located in the base element of the moulding tool separated from the working chamber by a transfer line comprising a bridge over a flow-through channel;
   closing a cap of the moulding tool, the cap extending over the working chamber, the bridge, and the storage chamber thus sealing the working chamber and the storage chamber against the environment of the moulding tool after the inserting of the semi-finished product and the feeding of the resin material into the moulding tool;
   heating the resin material located in the storage chamber; and
   transferring the resin material via a transfer line into the semi-finished product by at least one of charging of the storage chamber with compressed air or evacuating of the working chamber.

2. The method according to claim 1, wherein the step of heating the resin material located in the storage chamber comprises a heating of the complete moulding tool.

3. The method according to claim 1, further comprising:
   filtering the resin material in the transfer line at the transfer from the storage chamber into the working chamber.

* * * * *